No. 744,502. PATENTED NOV. 17, 1903.
H. S. DELAMERE.
PLAYING CARDS.
APPLICATION FILED AUG. 10, 1901.
NO MODEL. 2 SHEETS—SHEET 1.

Witnesses
Inventor
H. S. Delamere.
By
Attorneys

No. 744,502. PATENTED NOV. 17, 1903.
H. S. DELAMERE.
PLAYING CARDS.
APPLICATION FILED AUG. 10, 1901.
NO MODEL. 2 SHEETS—SHEET 2.
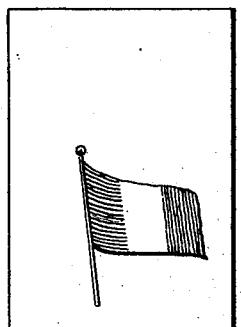
Fig. 13.
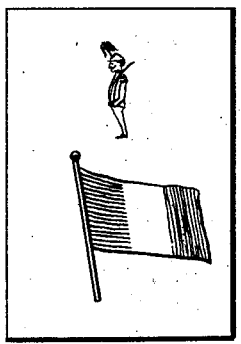
Fig. 14.
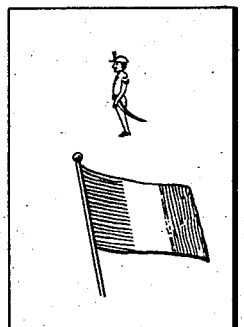
Fig. 15.
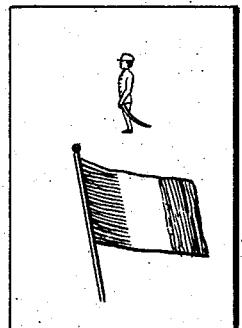
Fig. 16.
Fig. 17.
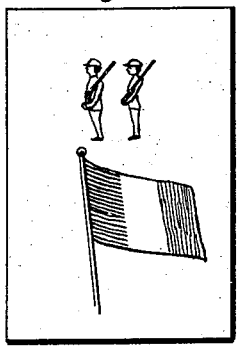
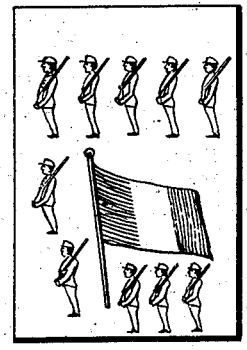
Fig. 18.
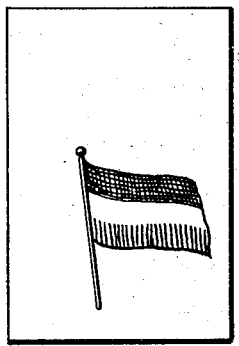
Fig. 19.
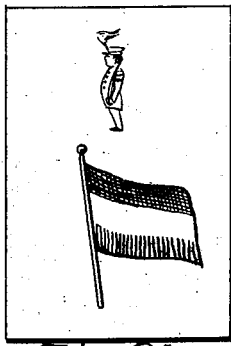
Fig. 20.
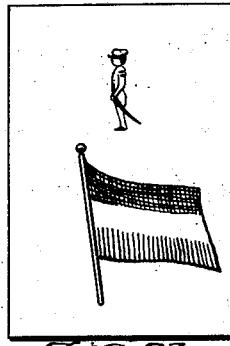
Fig. 21.
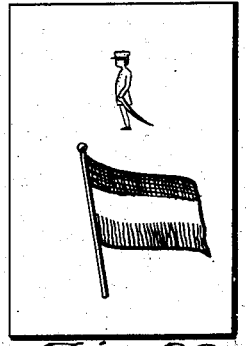
Fig. 22.
Fig. 23.
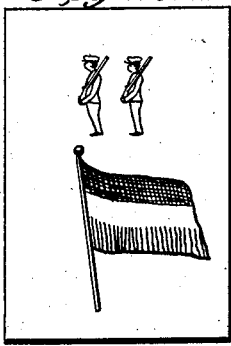
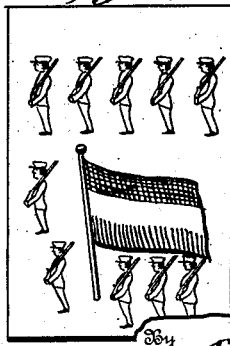
Fig. 24.
Witnesses
Inventor
H. S. Delamere.
By
Attorneys No. 744,502. Patented November 17, 1903.

UNITED STATES PATENT OFFICE.

HENRY S. DELAMERE, OF FERNDALE, CALIFORNIA.

PLAYING-CARDS.

SPECIFICATION forming part of Letters Patent No. 744,502, dated November 17, 1903.

Application filed August 10, 1901. Serial No. 71,572. (No model.)

*To all whom it may concern:*

Be it known that I, HENRY S. DELAMERE, a citizen of the United States, residing at Ferndale, in the county of Humboldt and State of California, have invented new and useful Playing-Cards, of which the following is a specification.

This invention relates to a game apparatus, and more particularly to a pack of cards used for playing games.

The object of this invention is to provide a pack of playing-cards by means of which games of an instructive and amusing character can be played; and with this object in view the invention consists in providing a pack of cards divided into a plurality of differently-designated series, each separate series bearing some distinctive mark indicative of a particular nation, the cards of each series having representations of military figures placed thereon to indicate the values of the different cards of each series.

The invention consists also in certain details hereinafter fully set forth, and pointed out in the claim.

Figure 1:
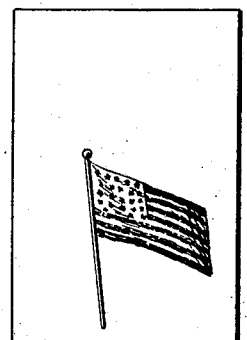
Figure 2:
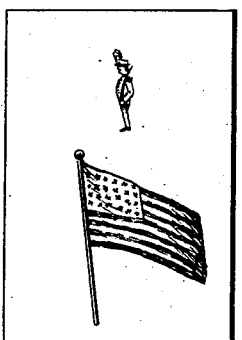
Figure 3:
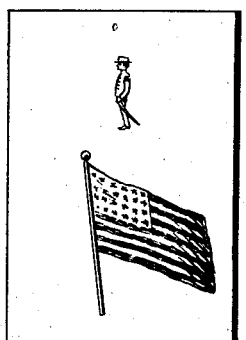
Figure 4:
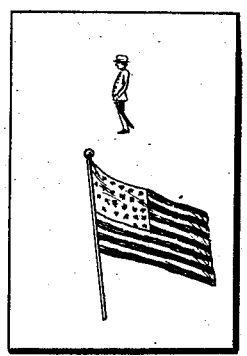
Figure 5:
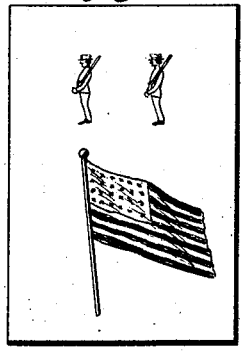
Figure 6:
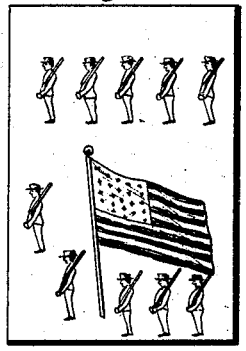
Figure 7:
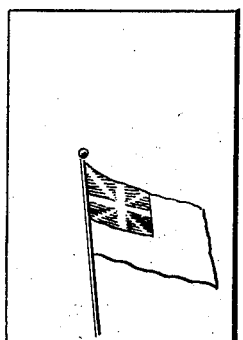
Figure 8:
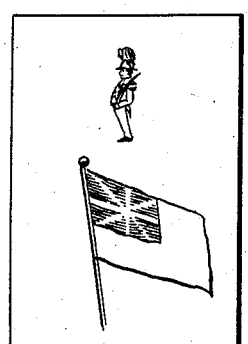
Figure 9:
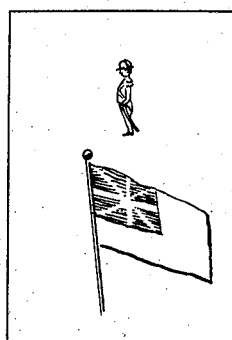
Figure 10:
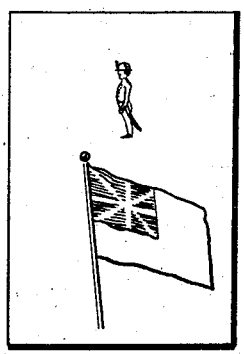
Figure 11:
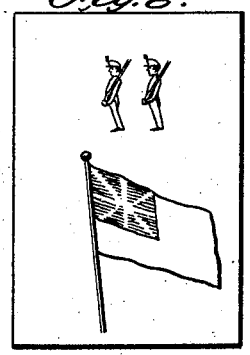
Figure 12:
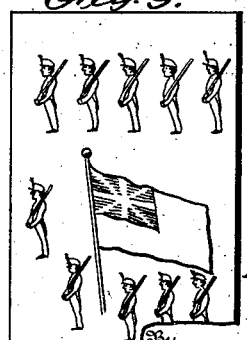

In the drawings forming part of this specification, Figure 1 represents a card of the highest denomination of one series; Fig. 2, a card of the second highest denomination of the said series; Fig. 3, a card of the third highest denomination of the said series; Fig. 4, the fourth of said series. Fig. 5 represents a two-spot card of the said series; Fig. 6, a ten-spot card of the said series. Figs. 7, 8, 9, 10, 11, and 12 represent corresponding cards of the second series. Figs. 13, 14, 15, 16, 17, and 18 represent corresponding cards of the third series. Figs. 19, 20, 21, 22, 23, and 24 represent corresponding cards of the fourth series.

In carrying out my invention I employ fifty-two cards constituting the pack, the said pack being divided, preferably, into four series, and the thirteen cards of the first series have the flag or national emblem of one nation printed thereon, the thirteen cards of the second series the flag or national emblem of a second nation printed thereon, and the third and fourth series have the representations of other nations printed thereon. The card of the highest denomination of each series has only the flag or national emblem, as indicated in Figs. 1, 7, 13, and 19, Fig. 1 representing the American nation, Fig. 7 the British nation, Fig. 13 the French, and Fig. 19 the German. The card of the second highest denomination of each series bears the representation of the flag or national emblem, together with the representation of a military officer of high rank. The third highest card bears the representation of the flag or emblem and also the representation of a military officer of a rank lower than the second card, and the fourth highest card bears the representation of the flag or emblem and the representation of a military officer of a rank lower than the officer represented upon the third highest card. The values of the remaining cards of each series are governed by the number of representations of military figures placed thereon. Thus in Fig. 5 two figures are represented, giving the card the value of a two-spot card, while in Fig. 6 ten representations are shown, thus giving the card the value of a ten-spot card.

The games which can be played with a pack of cards of this character are numerous, including those in which different values can be arbitrarily given to the ranks of the officers relatively to each other, as well as others in which a still further variation can be given to the officers over the soldiers, or the values of the officer-cards can be made to correspond with the soldier-cards, in which case the officer-card would become the ace or single-unit card, and any desired value could be given to the card with only the flag or suit emblem on it. By having four cards in each suit that may become the ace or high card arbitrary or variable values can thus be given to each of them and the scope of games that can be played by the pack can be correspondingly increased. For instance, a game of war may be played in which the suit-card may be given the highest value, as the commander-in-chief, and the other three officer-cards be given decreasing values; but in case of the absence or capture of said card by an opponent then the next ranking-officer card will take its place, the same as at the death or capture of such an officer in real warfare, and so on with the remaining officers, or the suit-card may be held in reserve as "high private," as it were, only to assume the highest value on the absence or capture of the regular officers. By distributing all of the cards at the beginning of the game or by drawing from the pack to simulate subsequent volunteers or drafts upon the people for continuing the conflict the game of war can be rendered very interesting and instructive in the way of tactics, as well as otherwise.

In addition to providing amusing games this pack of cards is calculated to impart knowledge or instruction, inasmuch as it familiarizes the players with the flags and national emblems of the different nations and also familiarizes them with the uniforms of the different grades of officers and also of the uniforms worn by the different nations.

Having thus fully described my invention, what I claim as new, and desire to secure by Letters Patent, is—

A pack of cards divided into suits or series, each card of each series being provided with the representation of the flag of a particular nation to indicate its suit, and each card except one of each series being provided with the representation of a military figure, three of said cards being each provided with a single figure and the other cards being provided with a plurality of similar figures, the numbers of said figures increasing in numerical order from two upward, and the single figures being different from each other and from the multiple figures whereby different values, consecutive or otherwise, may be given to four cards of each suit, while the values of the remaining cards will be indicated each by the number of figures it contains.

HENRY S. DELAMERE.

Witnesses:
S. H. MINER,
C. W. MINER.